US010976900B2

(12) United States Patent
Nagahiro

(10) Patent No.: US 10,976,900 B2
(45) Date of Patent: Apr. 13, 2021

(54) DATA SELECTION IN A PREDETERMINED DIRECTION

(71) Applicant: SONY CORPORATION, Tokyo (JP)

(72) Inventor: Koji Nagahiro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 288 days.

(21) Appl. No.: 15/781,611

(22) PCT Filed: Oct. 6, 2016

(86) PCT No.: PCT/JP2016/079775
§ 371 (c)(1),
(2) Date: Jun. 5, 2018

(87) PCT Pub. No.: WO2017/110208
PCT Pub. Date: Jun. 29, 2017

(65) Prior Publication Data
US 2020/0264744 A1 Aug. 20, 2020

(30) Foreign Application Priority Data
Dec. 25, 2015 (JP) .............................. JP2015-252885

(51) Int. Cl.
G06F 3/0484 (2013.01)
H04N 5/232 (2006.01)
G06F 3/0482 (2013.01)

(52) U.S. Cl.
CPC .......... *G06F 3/0484* (2013.01); *G06F 3/0482* (2013.01); *H04N 5/23216* (2013.01); *H04N 5/23245* (2013.01); *H04N 5/232933* (2018.08)

(58) Field of Classification Search
CPC ................ G06F 3/0484; G06F 3/0482; H04N 5/232933; H04N 5/23245; H04N 5/23216
See application file for complete search history.

(56) References Cited

U.S. PATENT DOCUMENTS

| 2006/0187204 A1 | 8/2006 | Yi et al. |
| 2011/0057872 A1* | 3/2011 | Hasegawa ......... H04M 1/72583 345/156 |
| 2013/0332961 A1* | 12/2013 | Ishigaki ............... H04N 21/237 725/44 |

FOREIGN PATENT DOCUMENTS

| CN | 1825265 A | 8/2006 |
| EP | 1703706 A1 | 9/2006 |

(Continued)

OTHER PUBLICATIONS

International Search Report and Written Opinion of PCT Application No. PCT/JP2016/079775, dated Nov. 15, 2016, 10 pages of ISRWO.

*Primary Examiner* — Phuong H Nguyen
(74) *Attorney, Agent, or Firm* — Chip Law Group

(57) ABSTRACT

The display unit 12 displays an item-selection-screen, on which selectable items are two-dimensionally-arranged. The operation input unit 13 receives a user's operation. The controller unit 15 selects, every time an operation input unit receives an item-change-operation, items two-dimensionally-arranged on an item-selection-screen in order in a predetermined selection-direction, selects an item at an end in the selection-direction, and then selects adjacent-items in order in the selection-direction from an item at an end in a direction opposite to the selection-direction, the adjacent-items being adjacent at a predetermined side of the selection-direction. Since the items are two-dimensionally-arranged on the item-selection-screen, a user may easily understand the selectable items. Further, only by executing the item-change-operation again and again, it is possible to easily select a desired item. It is possible to execute setting or the like of the desired item efficiently and easily.

11 Claims, 13 Drawing Sheets

(56) References Cited

FOREIGN PATENT DOCUMENTS

| | | |
|---|---|---|
| JP | 2003-084901 A | 3/2003 |
| JP | 2006-236355 A | 9/2006 |
| JP | 2012-144225 A | 8/2012 |
| JP | 2012-230634 A | 11/2012 |
| JP | 2013-186836 A | 9/2013 |
| JP | 2015-127920 A | 7/2015 |

* cited by examiner

| SE9 | SE10 | SE11 | SE12 |
|---|---|---|---|
| SE5 | SE6 | SE7 | SE8 |
| SE1 | SE2 | SE3 | SE4 |

FIG. 2A

| SE9 | SE10 | SE11 | SE12 |
|---|---|---|---|
| SE5 | SE6 | SE7 | SE8 |
| SE1 | SE2 | SE3 | SE4 |

FIG. 2B

| SE9 | SE10 | SE11 | SE12 |
|---|---|---|---|
| SE5 | SE6 | SE7 | SE8 |
| SE1 | SE2 | SE3 | SE4 |

FIG. 2C

| SE9 | SE10 | SE11 | SE12 |
|---|---|---|---|
| SE5 | SE6 | SE7 | SE8 |
| SE1 | SE2 | SE3 | SE4 |

FIG. 2D

| SE9 | SE10 | SE11 | SE12 |
|---|---|---|---|
| SE5 | SE6 | SE7 | SE8 |
| SE1 | SE2 | SE3 | SE4 |

FIG. 2E

| SE9 | SE10 | SE11 | SE12 |
|---|---|---|---|
| SE5 | SE6 | SE7 | SE8 |
| SE1 | SE2 | SE3 | SE4 |

FIG. 2F

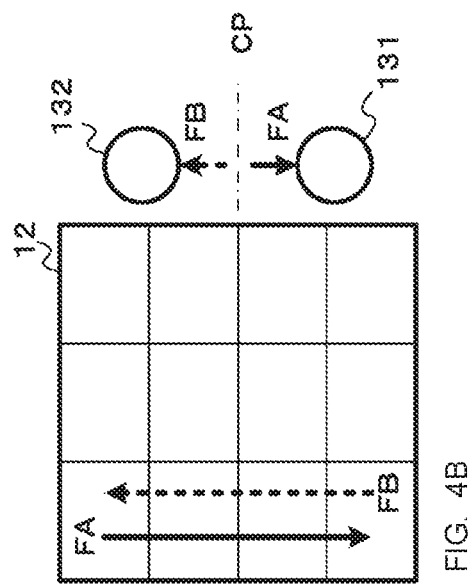
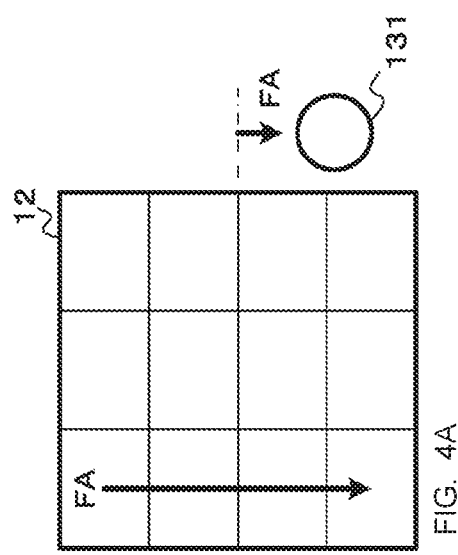

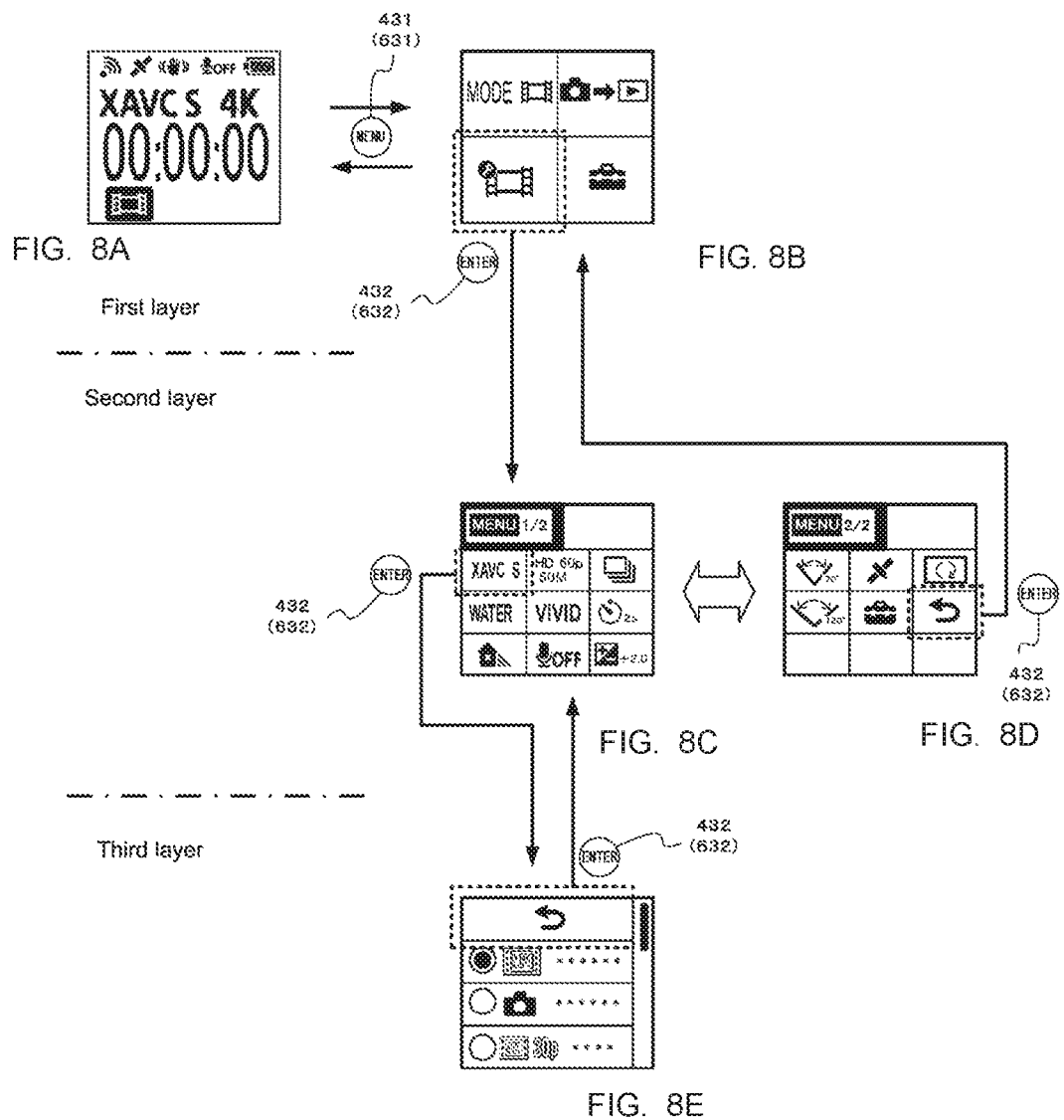

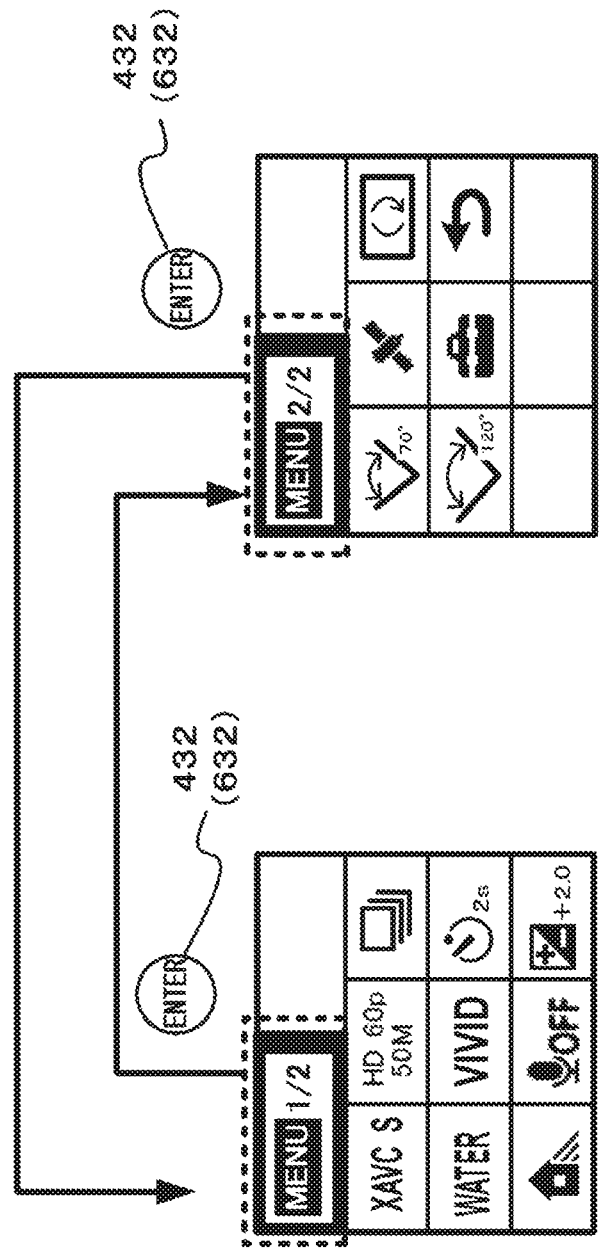

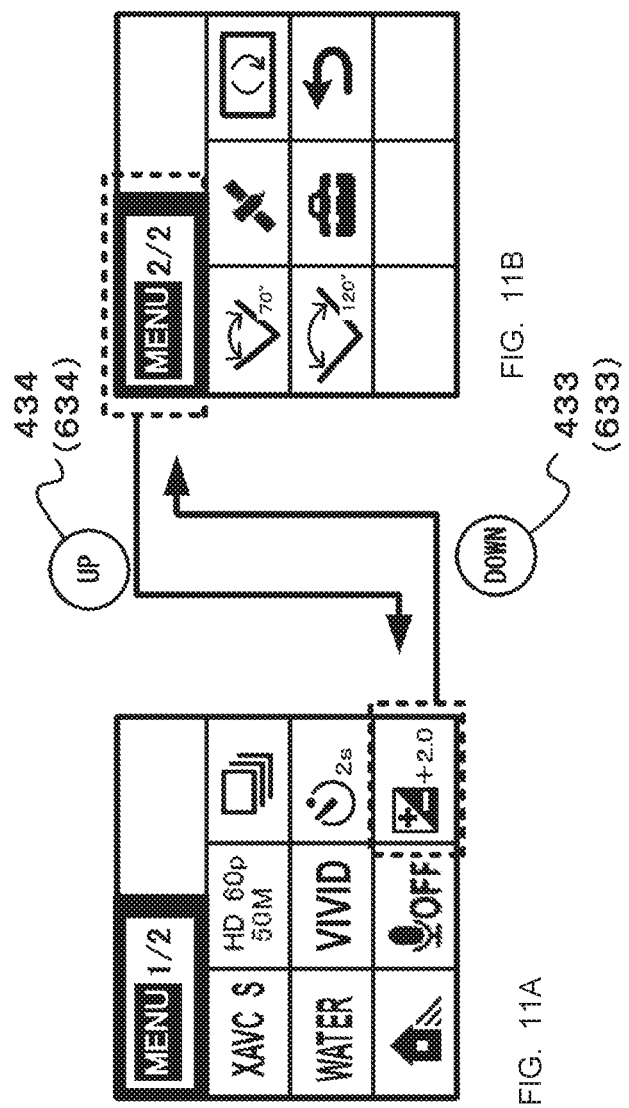

DATA SELECTION IN A PREDETERMINED DIRECTION

CROSS REFERENCE TO RELATED APPLICATIONS

This application is a U.S. National Phase of International Patent Application No. PCT/JP2016/079775 filed on Oct. 6, 2016, which claims priority benefit of Japanese Patent Application No. JP 2015-252885 filed in the Japan Patent Office on Dec. 25, 2015. Each of the above-referenced applications is hereby incorporated herein by reference in its entirety.

TECHNICAL FIELD

The present technology relates to an information processing apparatus, an information processing method, and a program.

BACKGROUND ART

In the past, an electronic apparatus such as a digital camera has various functions, and therefore has complex operations, settings, and the like of the device. Further, a downsized electronic apparatus may have less operation keys, operation buttons, and the like. For example, according to Patent Literature 1, an information processing apparatus that communicates with an image-taking apparatus has an operation unit. It is possible to operate the operation unit to display a taken image, change a GUI, and the like.

CITATION LIST

Patent Literature

Patent Literature 1: Japanese Patent Application Laid-open No. 2015-127920

DISCLOSURE OF INVENTION

Technical Problem

By the way, since an electronic apparatus has various functions, the apparatus has a larger number of setting items for behaviors, functions, and the like. So it is desirable, even if an electronic apparatus has less operation keys, operation buttons, and the like, to execute setting of a desired item efficiently and easily.

In view of the above-mentioned circumstances, it is an object of the present technology to provide an information processing apparatus, an information processing method, and a program, with which it is possible to execute setting of a desired item efficiently and easily.

Solution to Problem

According to a first aspect of the present technology, there is provided an information processing apparatus, including: a controller unit that selects, every time an operation input unit receives an item-change-operation, items two-dimensionally-arranged on an item-selection-screen in order in a predetermined selection-direction, selects an item at an end in the selection-direction, and then selects adjacent-items in order in the selection-direction from an item at an end in a direction opposite to the selection-direction, the adjacent-items being adjacent at a predetermined side of the selection-direction.

According to the present technology, the display unit displays an item-selection-screen, on which selectable items are two-dimensionally-arranged. The operation input unit receives a user's operation such as an item-change-operation and a specifying-operation. The controller unit selects, every time an operation input unit receives an item-change-operation, items arranged in a predetermined selection-direction on an item-selection-screen in order, selects an item at an end in the selection-direction, and then selects adjacent-items in order in the selection-direction from an item at an end in a direction opposite to the selection-direction, the adjacent-items being adjacent at a predetermined side of the selection-direction. For example, the controller unit selects items in a first direction in order, the items being two-dimensionally-arranged on the item-selection-screen in the first direction and a second direction orthogonal to the first direction, selects an item at an end in the first direction, and then selects adjacent-items in order in the first direction from an item at an end in a direction opposite to the end in the first direction, the adjacent-items being adjacent at a side of the second direction. Further, the controller unit selects, where no item is adjacent to the items arranged in the selection-direction at the predetermined side of the selection-direction, the item at the end in the selection-direction, and then selects an item at a diagonal corner of the item-selection-screen.

Further, the controller unit displays, where the number of the items is larger than a predetermined number, the items on a plurality of item-selection-screens separately, and changes, where no item is adjacent to the items arranged in the selection-direction at the predetermined side of the selection-direction and the item at the end in the selection-direction is selected, the item-selection-screens thereafter. The controller unit provides caption-display for selecting and displaying the item-selection-screen for each item-selection-screen, and locates an item-selection-position after changing the item-selection-screen at a position of the caption-display. The controller unit changes, when a specifying-operation is executed in a status where the item-selection-position is at the caption-display, the item-selection-screens. The controller unit locates, when the item-change-operation is executed, the item-selection-position at a preset item position on the item-selection-screen.

The items are in a layered structure, and the controller unit changes layers, when a specifying-operation is executed and where an item at an item-selection-position is not an item of a lowermost layer, and displays an item-selection-screen in association with the item at the item-selection-position. The controller unit adds an item, to which a function to return to the item-selection-screen before changing the layers is assigned, to an item-selection-screen after changing the layers. Further, the controller unit displays, where a display-information-amount of the items is equal to or larger than a threshold, an item-selection-screen including list-display of the items.

The operation input unit includes an item-change-operation-section that receives the item-change-operation, and the item-change-operation-section is arranged at a position displaced from a center of a display unit in the predetermined selection-direction. Further, the operation input unit includes a first item-change-operation-section and a second item-change-operation-section, the first item-change-operation-section is arranged at a position displaced from the center of the display unit in the predetermined selection-direction, the display unit displaying the item-selection-screen, the second item-change-operation-section is arranged at a position displaced from the center of the display unit in a direction opposite to the predetermined selection-direction, the controller unit selects, every time a user's operation is executed in the first item-change-operation-section, items in order in the predetermined selection-direction, the items being arranged in the predetermined selection-direction, and the controller unit selects, every time a user's operation is executed in the second item-change-operation-section, the items in order in a direction opposite to the direction when the operation is executed in the first item-change-operation-section.

According to a second aspect of the present technology, there is provided an information processing method, including: selecting, every time an item-change-operation is received, items two-dimensionally-arranged on an item-selection-screen in order in a predetermined selection-direction; selecting an item at an end in the selection-direction; and then selecting adjacent-items in order in the selection-direction from an item at an end in a direction opposite to the selection-direction, the adjacent-items being adjacent at a predetermined side of the selection-direction.

According to a third aspect of the present technology, there is provided a program executable by a computer, in which when the computer executes the program, the computer executes an item-selecting-behavior including the steps of: selecting, every time an item-change-operation is received, items two-dimensionally-arranged on an item-selection-screen in order in a predetermined selection-direction; selecting an item at an end in the selection-direction; and then selecting adjacent-items in order in the selection-direction from an item at an end in a direction opposite to the selection-direction, the adjacent-items being adjacent at a predetermined side of the selection-direction.

Note that the program of the present technology is, for example, a program that may be provided by means of a storage medium or a communication medium, which provides programs of computer readable formats to general-purpose computers capable of executing various program codes. For example, examples of the storage medium include an optical disk, a magnetic disk, a semiconductor memory, and the like. Examples of the communication medium include a network and the like. By providing such a program of a computer readable format, a computer executes the process depending on the program.

Advantageous Effects of Invention

According to the present technology, the information processing apparatus selects, every time an operation input unit receives an item-change-operation, items two-dimensionally-arranged on an item-selection-screen in order in a predetermined selection-direction, selects an item at an end in the selection-direction, and then selects adjacent-items in order in the selection-direction from an item at an end in a direction opposite to the selection-direction, the adjacent-items being adjacent at a predetermined side of the selection-direction. As a result, only by executing the item-change-operation again and again, it is possible to easily select a desired item from a plurality of two-dimensionally-displayed items. Therefore it is possible to execute setting of a desired item efficiently and easily. Note that effects described in the present description are not limitations but merely examples. Additional effects may be obtained.

BRIEF DESCRIPTION OF DRAWINGS

FIGS. 2A, 2B, 2C, 2D, 2E, and 2F Diagrams showing an example of the item-selecting-behavior.

FIGS. 4A and 4B Diagrams showing an example of a positional relation between the item-change-buttons and the display unit.

FIGS. 8A, 8B, 8C, 8D, and 8E Diagrams showing an example of the item-selecting-behavior.

FIGS. 10A and 10B Diagrams for illustrating a page-change behavior of the item-selection-screen of the video image setting.

FIGS. 11A and 11B Diagrams for illustrating another page-change behavior of the item-selection-screen of the video image setting.

MODE(S) FOR CARRYING OUT THE INVENTION

Hereinafter, embodiments for carrying out the present technology will be described. Note that the description will be made in the following order.

Figure 1:
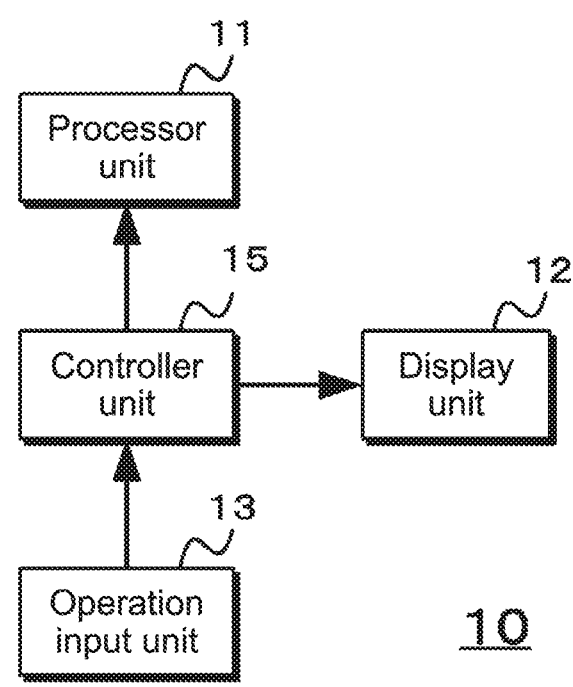
FIG. 1 A diagram showing a configuration of an information processing apparatus.

1. Configuration and Behavior of Information Processing Apparatus
2. Application Example
3. Other Embodiments 1. Configuration and Behavior of Information Processing Apparatus FIG. 1 shows a configuration of an information processing apparatus of the present technology. The information processing apparatus 10 includes the processor unit 11, the display unit 12, the operation input unit 13, and the controller unit 15.

The processor unit 11 is a block that executes various processes of the information processing apparatus 10. For example, where the information processing apparatus 10 is applied to an image-taking system (described later), the processor unit 11 executes a process of generating image signals of still images and video images and other processes.

The display unit 12 includes a liquid crystal display device, an organic EL display device, or the like. The display unit 12 displays information processed by the processor unit 11, displays a setting screen of a process executed by the processor unit 11, and the like.

The operation input unit 13 includes operation buttons, operation switches, and the like, generates operation signals on the basis of user's operations, and outputs the operation signals to the controller unit 15.

The controller unit 15 controls the processor unit 11 on the basis of the operation signals from the operation input unit 13, and the processor unit 11 thereby executes appropriate processes depending on the user's operations. Further, the controller unit 15 displays an item-selection-screen on the display unit 12, in which items about behaviors, functions, and the like of the information processing apparatus 10 are two-dimensionally-arranged. Further, the controller unit 15 changes items, specifies an item, sets the specified item, and the like on the basis of operation signals supplied from the operation input unit 13 when the item-selection-screen is displayed. The controller unit 15 controls the respective units of the information processing apparatus 10 in order that they execute appropriate behaviors depending on the user's operations.

Next, behaviors of the information processing apparatus 10 will be described. The controller unit 15 selects, every time the operation input unit 13 receives an item-change-operation, items two-dimensionally-arranged on an item-selection-screen in order in a predetermined selection-direction. Further, the controller unit 15 selects an item at an end in the selection-direction, and then selects adjacent-items in order in the selection-direction from an item at an end in a direction opposite to the selection-direction, the adjacent-items being adjacent at a predetermined side of the selection-direction.

FIGS. 2A, 2B, 2C, 2D, 2E, and 2F shows an example of the item-selecting-behavior. The operation input unit 13 includes an operation button to start or finish the item-selecting-behavior, a selection operation button to relocate an item-selection-position, and a specifying-operation button to execute the specifying-operation of specifying the item indicated by the item-selection-position (not shown). When a start-operation of the item-selecting-behavior is executed, the controller unit 15 displays the item-selection-screen. FIG. 2A shows an example of items two-dimensionally-arranged on the item-selection-screen. For example, FIG. 2A shows that the items SE1 to SE12 are two-dimensionally-arranged in a 4×3 matrix.

When the controller unit 15 displays the item-selection-screen, the controller unit 15 displays the item-selection-position such that a user may identify the item-selection-position. Further, the item-selection-position at a time when the item-selection-screen is displayed is a predetermined position or the position of the item selected when the previous item-selecting-behavior was finished. FIG. 2B shows an example of an item-selection-position at a time when the item-selection-screen is displayed, and the item SE1 surrounded by a dotted-line-frame is the item-selection-position.

Where the controller unit 15 determines that the item-change-operation is executed, as shown in FIG. 2C, the controller unit 15 relocates the item-selection-position to a predetermined selection-direction (for example, direction shown by the arrow), and treats the item SE2 as an item. Then, every time the item-change-operation is executed, the controller unit 15 relocates the item-selection-position in the predetermined selection-direction.

Further, when the controller unit 15 determines that the item-change-operation is executed in a status where the item-selection-position is at the position of the item SE4 at the end in the selection-direction, as shown in FIG. 2D, the controller unit 15 relocates the item-selection-position to the position of the item (SE5) of the adjacent-items (SE5 to SE8) at the end in the direction opposite to the selection-direction, the adjacent-items (SE5 to SE8) being adjacent to the items (SE1 to SE4), which are arranged in the selection-direction, at a predetermined side of the selection-direction. Then, where the controller unit 15 determines that the item-change-operation is executed, as shown in FIG. 2E, the controller unit 15 relocates the item-selection-position to the position of the item (SE6) adjacent in the predetermined selection-direction.

Further, the controller unit 15 selects, where no item is adjacent to the items arranged in the selection-direction at the predetermined side of the selection-direction, the item at the end in the selection-direction, and then selects an item at a diagonal corner of the item-selection-screen. In other words, the controller unit 15 selects the item SE9 to the item SE12, which are at the end position of the item-selection-screen, in order in the predetermined selection-direction, selects the item SE12, which is the item at the end in the selection-direction, and then relocates the item-selection-position to the position of the item SE1 at the diagonal corner.

The information processing apparatus executes the aforementioned process. Every time a user executes the item-change-operation, the information processing apparatus relocates the item-selection-position in the order shown by the arrows of FIG. 2F. Therefore, without providing directional operation buttons for relocating the item-selection-position right, left, up, and down, for example, it is possible to select a desired item by providing an operation button to relocate the item-selection-position in a predetermined selection-direction and only by operating the operation button by a user. Further, since the items are two-dimensionally-arranged on the item-selection-screen, a user may easily understand the selectable items.

Figure 3:
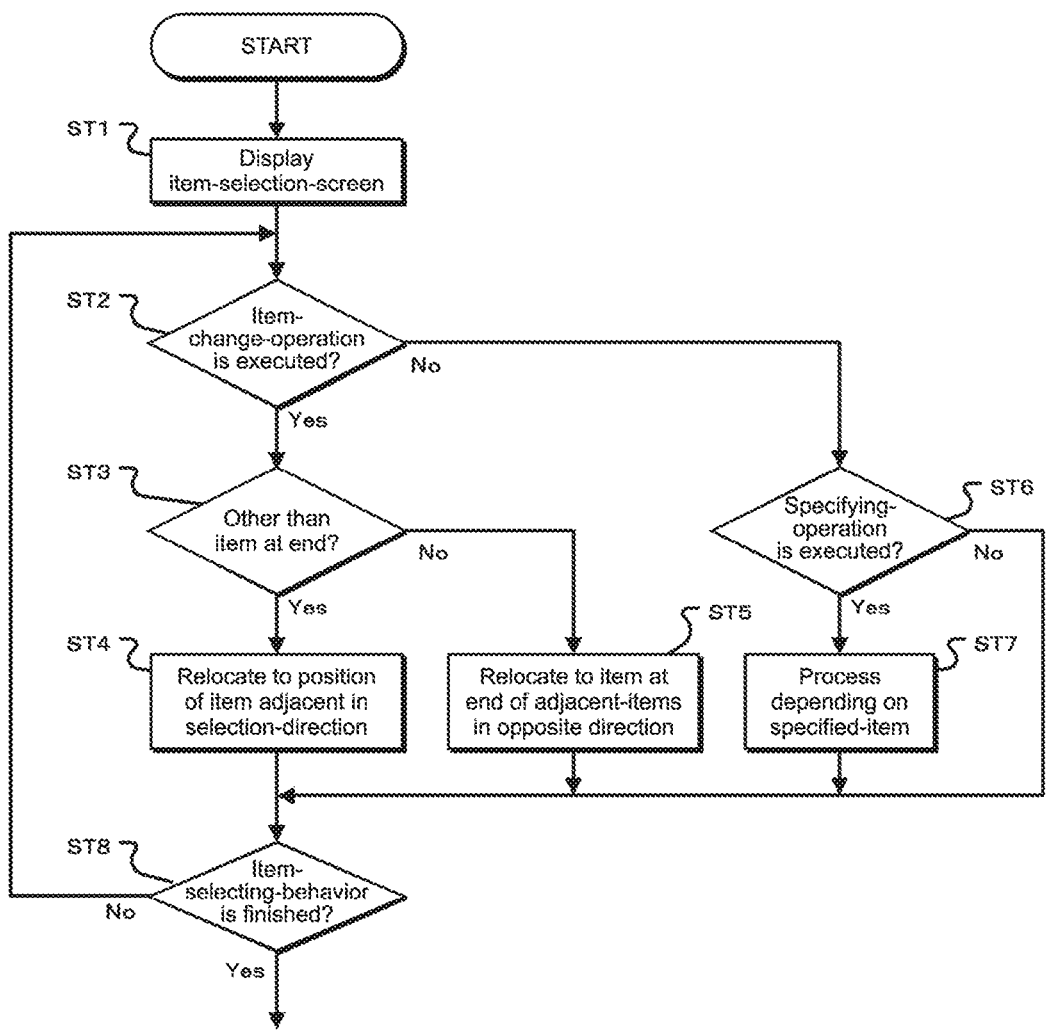
FIG. 3 A flowchart showing the item-selecting-behavior.

FIG. 3 is a flowchart showing the item-selecting-behavior. Where the start-operation of the item-selecting-behavior is executed, the controller unit 15 executes the process of FIG. 3.

In Step ST1, the controller unit 15 displays the item-selection-screen. The controller unit 15 displays the item-selection-screen on the display unit 12, in which items are two-dimensionally-arranged. Further, the controller unit 15 locates the item-selection-position at a predetermined position on the item-selection-screen or the position of the item selected when the previous item-selecting-behavior was finished, and proceeds to Step ST2.

In Step ST2, the controller unit 15 determines whether or not the item-change-operation is executed. Where the controller unit 15 determines that the item-selection-operation is executed in the operation input unit 13, the controller unit 15 proceeds to Step ST3. Where the controller unit 15 determines that the item-selection-operation is not executed, the controller unit 15 proceeds to Step ST6.

In Step ST3, the controller unit 15 determines whether or not the item-selection-position is at the item at the end of the predetermined selection-direction. Where the item-selection-position is not at the position of the item at the end of the items, which are arranged in the predetermined selection-direction, the controller unit 15 proceeds to Step ST4. Where the item-selection-position is at the position of the item at the end, the controller unit 15 proceeds to Step ST5.

In Step ST4, the controller unit 15 relocates the item-selection-position to the position of the item adjacent in the predetermined selection-direction. The controller unit 15 relocates the item-selection-position to the position of the item adjacent to the item at the current item-selection-position in the predetermined selection-direction, and proceeds to ST8.

In Step ST5 after Step ST3, the controller unit 15 relocates the item-selection-position to the item at the end of the adjacent-items in the opposite direction. Since the item-selection-position is relocated to the position of the item at the end in the predetermined selection-direction, the controller unit 15 relocates the item-selection-position to the item at the end of the adjacent-items in the opposite direction, the adjacent-items being adjacent to the items, which are arranged in the selection-direction, at the predetermined side of the selection-direction, and proceeds to Step ST8. Further, where no item is adjacent to the items arranged in the selection-direction at the predetermined side of the selection-direction, the controller unit 15 selects an item at a diagonal corner of the item-selection-screen as an item at the end of the adjacent-items in the opposite direction, and relocates the item-selection-position.

In Step ST6 after Step ST2, the controller unit 15 determines whether or not the specifying-operation is executed. Where the controller unit 15 determines that the specifying-operation is executed in the operation input unit 13, the controller unit 15 proceeds to Step ST7. Where the controller unit 15 determines that the specifying-operation is not executed, the controller unit 15 proceeds to Step ST8.

In Step ST7, the controller unit 15 executes the process depending on a specified-item. The controller unit 15 changes the screen displayed on the display unit 12 into a screen in association with the item specified on the item-selection-screen, for example, a screen for executing setting, change, and the like, executes selection of the item, setting, change, and the like depending on user's operations, and proceeds to Step ST8.

In Step ST8, the controller unit 15 determines whether or not the item-selecting-behavior is finished. Where the controller unit 15 determines that the operation to finish the item-selecting-behavior is not executed in the operation input unit 13, the controller unit 15 returns to Step ST2. Where the controller unit 15 determines that the operation to finish is executed, the controller unit 15 finishes the item-selecting-behavior.

By executing the aforementioned process, the controller unit 15 can execute the item-selecting-behavior of FIGS. 2A, 2B, 2C, 2D, 2E, and 2F. Note that the flowchart of FIG. 3 is an example, and the item-selecting-behavior of FIGS. 2A, 2B, 2C, 2D, 2E, and 2F is not limited to the process of the process of FIG. 3.

By the way, where the operation button to relocate the item-selection-position in the predetermined selection-direction is provided, and if the item-selection-position passes by a desired item, it is necessary to operate the operation button again and again until the item-selection-position arrives at the position of the desired item. In view of that fact, by further providing an operation button to relocate the item-selection-position in the opposite direction, the item is selected easily. In this case, where the controller unit 15 determines that the item-change-operation is executed in the operation input unit 13, for example, when a first item-change-button is operated, the controller unit 15 relocates the item-selection-position in a predetermined selection-direction. Further, when a second item-change-button is operated, the controller unit 15 relocates the item-selection-position in a direction opposite to the direction when the first item-change-button is operated.

Further, by providing the item-change-buttons in association with the relocation-directions of the item-selection-position on the item-selection-screen, it is possible to easily understand the relocation-direction of the item-selection-position when the item-change-button is operated. FIGS. 4A and 4B show an example of a positional relation between the item-change-buttons and the display unit. For example, as shown in FIG. 4A, in order to change the position of the item in order in the arrow FA when the item-change-button 131 is operated, the item-change-button 131 is arranged at a position displaced from the center position CP of the display unit 12 in the arrow FA. Further, in order to change the position of the item in not only the predetermined selection-direction but also the opposite direction, the item-change-button 132, which changes the position of the item in order in the arrow FB, is arranged at a position displaced from the center position CP of the display unit 12 in the arrow FB. For example, as shown in FIG. 4B, in order to relocate the item-selection-position in the arrow FB, the item-change-button 132 is arranged at a position displaced from the center position CP of the display unit 12 in the arrow FB. In this manner, by providing the item-change-buttons, it is possible to easily understand the relocation-direction of the item-selection-position when the item-change-button is operated on the basis of the positions of the item-change-buttons on the display unit 12.

Further, the information processing apparatus may not only two-dimensionally-arrange the item on one screen, but also display, where the number of selectable items is larger than a predetermined number, the items on a plurality of item-selection-screens separately. Further, the information processing apparatus may generate a layered structure of the selectable items, and, when a selected item is specified, display a new item-selection-screen in association with the specified item.

2. Application Example

Figure 5:
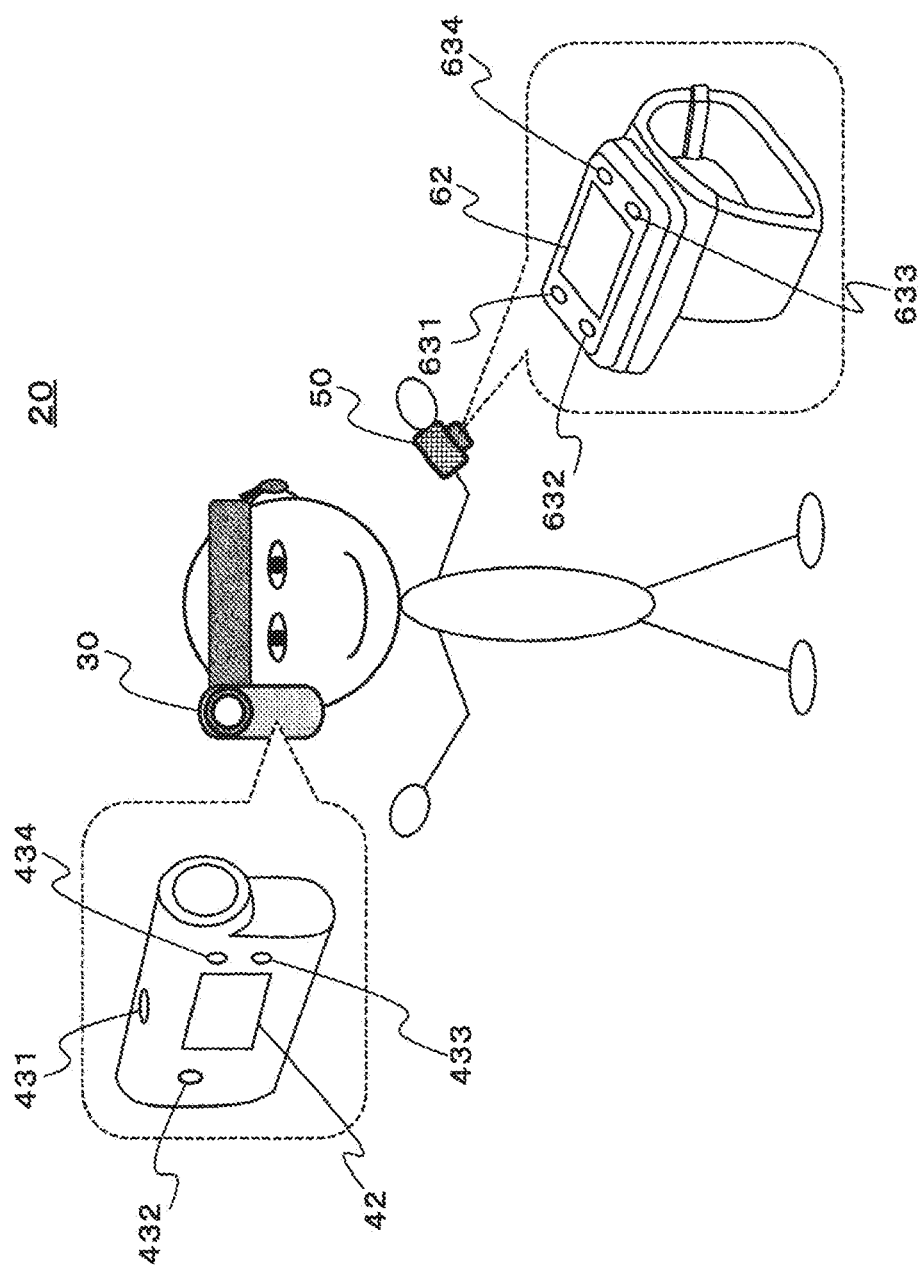
FIG. 5 A diagram showing an example of an image-taking system.

Next, as an application example of the information processing apparatus of the present technology, a case where the information processing apparatus of the present technology is applied to an image-taking apparatus and a remote control apparatus (hereinafter referred to as "remote control apparatus") will be described. FIG. 5 shows an example of an image-taking system including an image-taking apparatus and a remote control apparatus that remotely operates the image-taking apparatus.

Recently, image-taking apparatuses are downsized and light-weight. As shown in FIG. 5, for example, a user (videographer/photographer) feels less weight when he wears an image-taking apparatus on his head or the like during image-taking. However, as shown in FIG. 5, when a user wears the image-taking apparatus 30 on his head, it is difficult for the user to operate an operation input unit of the image-taking apparatus 30. Further, the user is not capable of watching an image displayed on a display unit of the image-taking apparatus 30, and therefore confirming a taken-image obtained. In view of that fact, the image-taking system 20 includes the remote control apparatus 50 with which a user can operate the image-taking apparatus 30 and confirm taken-images. The image-taking apparatus 30 includes the display unit 42 and the operation buttons 431 to 434 on its outer surface. The remote control apparatus 50 includes the display unit 62 and the operation buttons 631 to 634 on its front surface.

Figure 6:
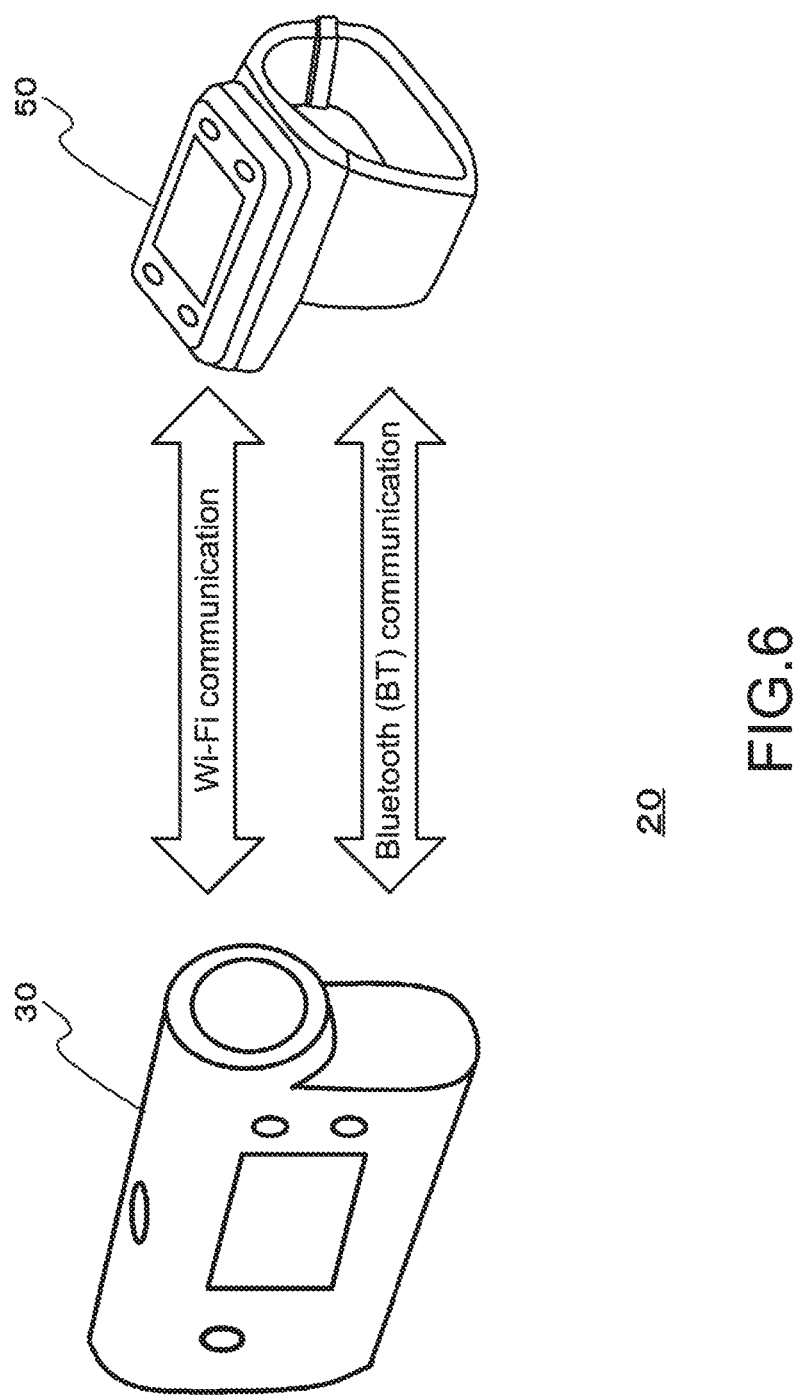
FIG. 6 A diagram showing an example of communication between the image-taking apparatus and the remote control apparatus.

FIG. 6 shows an example of communication between the image-taking apparatus and the remote control apparatus. The image-taking apparatus 30 includes a communication unit, and the remote control apparatus 50 includes a communication unit. The image-taking apparatus 30 communicates with the remote control apparatus 50 via the communication units via Wi-Fi communication or Bluetooth (registered trademark).

There are a plurality of Wi-Fi communication standards such as IEEE802.11a/b/g/n standards. Wi-Fi communication can use the bandwidth of 2.4 GHz 5 GHz to communicate, thus uses a wide bandwidth, has a relatively high communication speed, has a relatively long communicable distance (about 100 m), and can thus communicate large-volume data stably.

Bluetooth communication can use only one type of bandwidth, i.e., 2.4 GHz, has a communication speed lower than that of Wi-Fi, and has a communicable distance shorter than that of Wi-Fi (about 10 m). However, Bluetooth communication consumes less power than Wi-Fi communication, which is advantageous. Note that Bluetooth communication also has a plurality of standards. BILE (Bluetooth (registered trademark) Low Energy) standard consumes less power than the original Bluetooth communication. Note that "BILE" is sometimes referred to as "BLE". In the present description, "Bluetooth communication" means not only the original Bluetooth communication but also Bluetooth communication of BILE (Bluetooth (registered trademark) Low Energy) standard.

Figure 7:
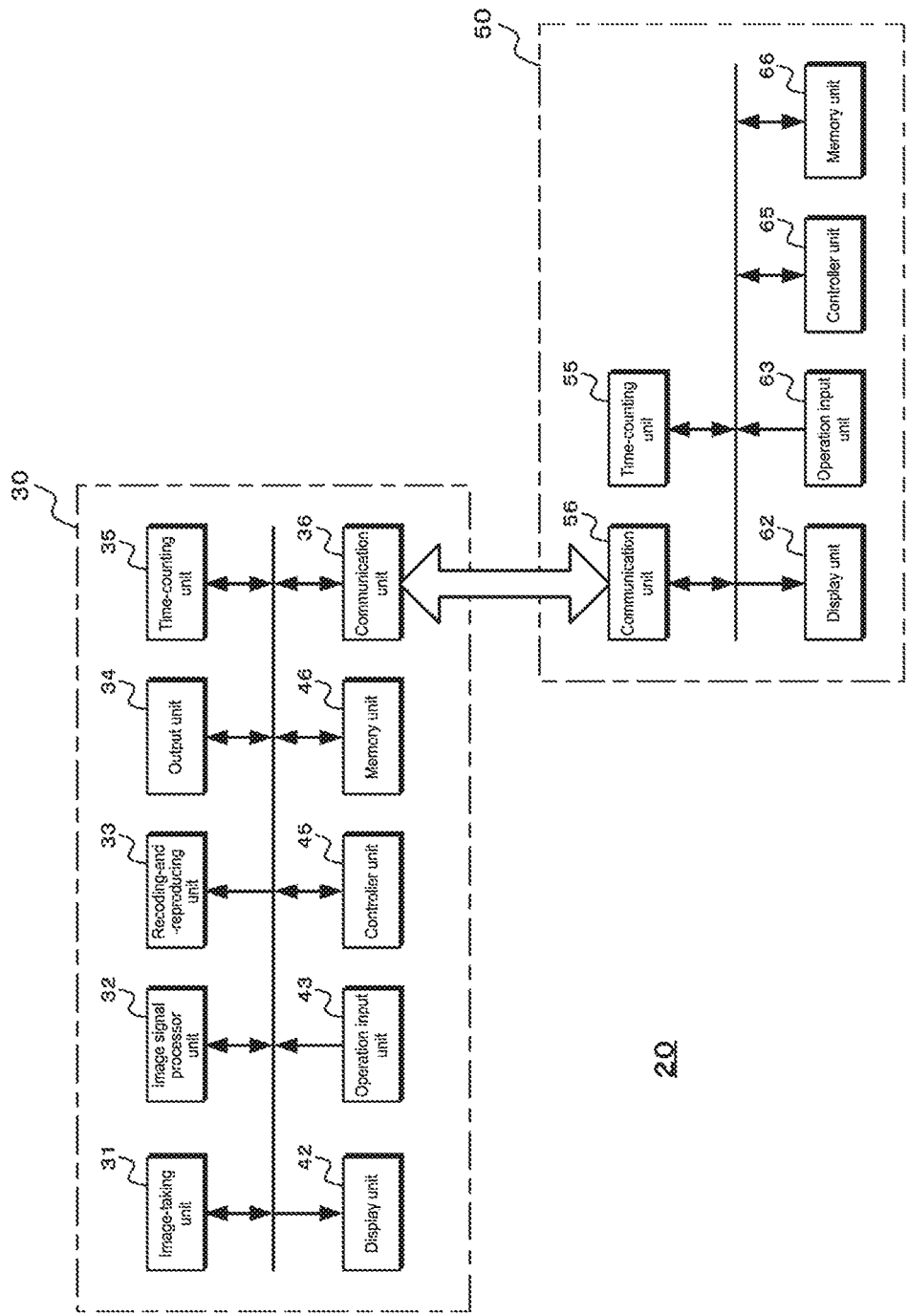
FIG. 7 A diagram showing an example of the configuration of the image-taking apparatus and the configuration of the remote control apparatus.

FIG. 7 shows an example of the configuration of the image-taking apparatus and the configuration of the remote control apparatus. The image-taking apparatus 30 includes the image-taking unit 31, the image signal processor unit 32, the recoding-and-reproducing unit 33, the output unit 34, the time-counting unit 35, the communication unit 36, the display unit 42, the operation input unit 43, the controller unit 45, and the memory unit 46. Note that the display unit 42, the operation input unit 43, and the controller unit 45 correspond to the display unit 12, the operation input unit 13, and the controller unit 15 of the information processing apparatus 10 of FIG. 1.

The image-taking unit 31 includes a CMOS (Complementary Metal Oxide Semiconductor) image sensor, a CCD (Charge Coupled Device) image sensor, or the like. The image-taking unit 31 is controlled by the controller unit 45, and generates image signals of video images and still images. The image signal processor unit 32 executes a developing process and the like by using the image signals generated by the image-taking unit 31.

The recoding-and-reproducing unit 33 includes a fixed or detachable recording medium. The recoding-and-reproducing unit 33 records, in the recording medium, image signals generated by the image-taking unit 31 or image signals to which image processing is executed by the image signal processor unit 32. Further, the recoding-and-reproducing unit 33 reproduces the image signals recorded in the recording medium. Further, the recoding-and-reproducing unit 33 may have a codec function and execute the following process. The recoding-and-reproducing unit 33 may encode image signals and record the encoded image signals in the recording medium, and decode the encoded data recorded in the recording medium and reproduce the image signals.

The output unit 34 executes a process of outputting image signals to an external device. The time-counting unit 35 has, for example, a clock function of indicating the current time, a time-measuring function of measuring an elapsed time from desired timing (for example, from timing of start of image-taking, or the like), and the like.

The communication unit 36 executes communication with the remote control apparatus 50. The communication unit 36 has a function of executing communication in conformity with the wireless communication standard such as Wi-Fi and Bluetooth. Further, the communication unit 36 may communicate with not only the remote control apparatus 50 but also another external device.

The display unit 42 includes a liquid crystal display device, an organic EL display device, or the like. The display unit 42 displays taken-images obtained by the image-taking unit 31, displays a setting screen of a behavior of the image-taking apparatus 30, and the like.

The operation input unit 43 includes the operation buttons 431 to 434 of FIG. 5 and the like, generates an operation signal depending on a user's operation, and outputs the operation signal to the controller unit 45. The operation button 431 is an operation button (hereinafter referred to as "MENU button") to change screens between the home screen and another screen. Every time the MENU button 431 is operated, the controller unit 45 changes screens between the home screen and, for example, a screen of executing selection and setting of functions, behaviors, and the like of the image-taking apparatus (hereinafter referred to as "item-selection-screen"). The operation button 432 is a specifying-button to specify, when the item-selection-screen is displayed, the item selected from the items displayed on the item-selection-screen (hereinafter referred to as "ENTER button"). When the specifying-button 432 is operated, the controller unit 45 executes setting of the function assigned to the selected item, the behavior assigned to the selected item, and the like. The operation buttons 433 and 434 are item-change-buttons to change the selected item. Every time the item-change-button 433 is operated, the controller unit 45 selects items in order in a predetermined selection-direction. Every time the item-change-button 434 is operated, the controller unit 45 selects items in order in a direction opposite to the direction when the item-change-button 433 is operated. For example, every time the item-change-button 433 (hereinafter referred to as "DOWN button") is operated, the controller unit 45 selects items in order in the down-direction. Every time the item-change-button 434 (hereinafter referred to as "UP button") is operated, the controller unit 45 selects items in order in the up-direction.

The controller unit 45 executes the program stored in the memory unit 46 and controls the respective units such that the image-taking apparatus 30 executes behaviors depending on a user's operations on the basis of operation signals from the operation input unit 43. Further, the controller unit 45 executes, on the basis of the operation signals, control of change of the displayed screen, change of the item selected on the displayed item-selection-screen, and the like, and control of setting of the function assigned to the selected item, the behavior assigned to the selected item, and the like.

The memory unit 46 includes a ROM (Read Only Memory), a RAM (Random Access Memory), and the like. The memory unit 46 stores an application program executed by the controller unit 45, and the like. Further, the memory unit 46 is also used as a storage area for parameters and the like applied to data process executed by the controller unit 45, and a work area.

The remote control apparatus 50 includes the time-counting unit 55, the communication unit 56, the display unit 62, the operation input unit 63, the controller unit 65, and the memory unit 66. Note that the display unit 62, the operation input unit 63, and the controller unit 65 correspond to the display unit 12, the operation input unit 13, and the controller unit 15 of the information processing apparatus 10 of FIG. 1.

The time-counting unit 55 has, for example, a clock function of indicating the current time, a time-measuring function of measuring an elapsed time from desired timing (for example, from timing of start of image-taking, or the like), and the like.

The communication unit 56 executes communication with the image-taking apparatus 30. The communication unit 56 has a function of executing communication in conformity with the wireless communication standard such as Wi-Fi and Bluetooth.

The display unit 62 includes a liquid crystal display device, an organic EL display device, or the like. The display unit 62 displays taken-images obtained by the image-taking apparatus 30, displays a setting screen of a behavior of the image-taking apparatus 30, and the like.

The operation input unit 63 includes the operation buttons 631 to 634 of FIG. 5 and the like, generates an operation signal depending on a user's operation, and outputs the operation signal to the controller unit 65. The function of the operation button 631 is similar to the function of the operation button 431 of the image-taking apparatus 30. Further, the functions of the operation buttons 632 to 634 are similar to the functions of the operation buttons 432 to 434 of the image-taking apparatus 30.

The controller unit 65 executes the program stored in the memory unit 66 and controls the image-taking apparatus 30 via the communication unit 56 such that the image-taking apparatus 30 executes behaviors depending on a user's operations on the basis of operation signals from the operation input unit 63. Further, the controller unit 65 executes, on the basis of the operation signals from the operation input unit 63, display-control of the display unit 62 similar to the image-taking apparatus 30. Note that the controller unit 65 may send the operation signals from the operation input unit 63 to the image-taking apparatus 30, and the image-taking apparatus 30 may execute display-control of the display unit 62 depending on the user's operations.

The memory unit 66 includes a ROM (Read Only Memory), a RAM (Random Access Memory), and the like. The memory unit 66 stores an application program executed by the controller unit 65, and the like. Further, the memory unit 66 is also used as a storage area for parameters and the like applied to data process executed by the controller unit 65, and a work area.

According to the image-taking system 20 having the aforementioned configuration, it is possible to control behaviors of the image-taking apparatus 30, change the behaviors, execute various settings, and the like by operating not only the operation input unit 43 of the image-taking apparatus 30 but also the operation input unit 63 of the remote control apparatus 50. Further, images showing the behavior status, setting status, and the like of the image-taking apparatus 30 and taken-images generated by the image-taking apparatus 30 are displayed on the screens of not only the display unit 42 of the image-taking apparatus 30 but also the display unit 62 of the remote control apparatus 50.

Further, in order to easily execute operations, settings, and the like of the image-taking apparatus, the common item-selection-screen is displayed on the display units 42 and 62 of the image-taking apparatus 30 and the remote control apparatus 50. As described above, since the common item-selection-screen is displayed on the display units 42 and 62, same operations will be input in the operation input unit 43 and the operation input unit 63 to execute the item-selecting-behavior. User-friendliness of operations will thus be increased.

Next, behaviors of the image-taking apparatus will be described. Each of the display unit 42 of the image-taking apparatus 30 and the display unit 62 of the remote control apparatus 50 displays the item-selection-screen showing the selectable items and the like. Note that, in the following description, the controller unit 45 executes the display-control and the like.

Where the number of the selectable items is larger than a first predetermined number, the controller unit 45 two-dimensionally-arranges and displays the items (hereinafter referred to as "two-dimensionally-display"). Further, where the number of the selectable items is equal to or smaller than a first predetermined number, the controller unit 45 arranges the items in a predetermined direction and displays the items (hereinafter referred to as "list-display"). In this manner, where the number of the selectable items is larger than the first predetermined number, the items are two-dimensionally-displayed. As a result, a user can understand the selectable items easily. Further, the larger the number of two-dimensionally-displayed items, the smaller the display-area to be assigned to one item. As a result, for example, it is difficult for a user to distinguish an icon or the like where the icon or the like for identifying the content of the item is displayed. In view of that fact, where the number of the items is larger than a second predetermined number, i.e., the maximum number of the items displayed on one screen (value larger than the first predetermined number), the controller unit 45 two-dimensionally-displays the items on a plurality of screens. Where the number of the items is smaller than the second predetermined number, the controller unit 45 two-dimensionally-displays the items on one screen. Further, where the items are two-dimensionally-displayed, the smaller the display-area to be assigned to one item, the smaller the display-information-amount for a user. In view of that fact, where the display-information-amount of the item is equal to or larger than a threshold, the controller unit 45 displays the item-selection-screen including list-display of the items on the display unit 42.

FIGS. 8A, 8B, 8C, 8D, and 8E show an example of the item-selecting-behavior. Note that FIGS. 8A, 8B, 8C, 8D, and 8E show an example of a layered structure showing the selectable items and including three layers, in which the first layer two-dimensionally-displays the items on one screen, the second layer two-dimensionally-displays the items on a plurality of screens, and the third layer executes list-display of the items.

When the controller unit 45 determines that the MENU button 431 (631) is operated in a status where the home screen is displayed as shown in FIG. 8A, the controller unit 45 changes to the item-selection-screen of the first layer of FIG. 8B. Further, when the controller unit 45 determines that the MENU button 431 (631) is operated in a status where the item-selection-screen of first layer is displayed, the controller unit 45 changes the display to the home screen.

The top of the screen of the home screen includes, from left in order, an icon showing that the communication function is active, an icon showing that the position is being measured and the position information can be recorded, an icon showing that the image stabilizer function is active, an icon showing that sounds are not recorded, and an icon showing that the battery charge remains. Further, the center of the screen includes an icon showing that the video-image-recording-format "XAVC S" is set, an icon showing that the "4K" resolution is set, and the time code display (FIGS. 8A, 8B, 8C, 8D, and 8E show 00:00:00). Further, the bottom of the screen of the home screen includes an icon showing the video image-taking mode.

The item-selection-screen of the first layer two-dimensionally-displays four selectable items on one screen. For example, the item at the upper-left end is the initial position of the item-selection-position on the item-selection-screen. The controller unit 45 relocates the item-selection-position from the position of the item depending on operations of the DOWN button 433 (633) or the UP button 434 (634). Note that, in each of FIGS. 8A, 8B, 8C, 8D, 8E, 9A, 9B, 9C, 10A, and 10B (described later), the item-selection-position is surrounded by the dotted-line-frame.

Figure 9A:
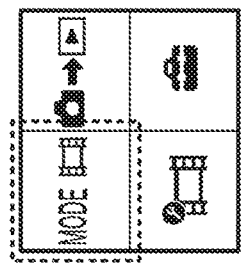
FIGS. 9A, 9B, and 9C Diagrams showing an example of the item-selecting-behavior of the item-selection-screen of the first layer.
Figure 9B:
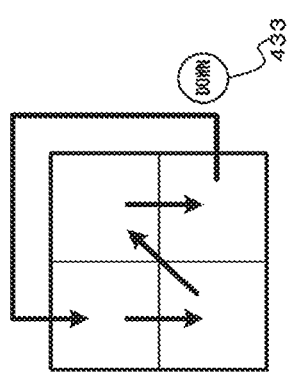
Figure 9C:
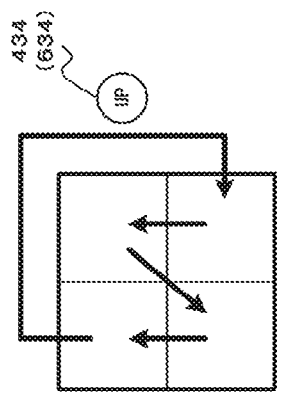

FIGS. 9A and 9B show the item-selecting-behavior of the item-selection-screen of the first layer. As shown in FIG. 9A, the item-selection-screen of the first layer includes an upper-left icon showing change of the image-taking mode, and a lower-left icon showing video image setting. Further, the item-selection-screen includes an upper-right icon showing change of the reproduction mode, and a lower-right icon showing environment setting.

When the item-selection-screen of the first layer is displayed, every time the controller unit 45 determines that the DOWN button 433 (633) is operated, the controller unit 45 relocates the item-selection-position in the order of the arrows of FIG. 9B. Further, every time the controller unit 45 determines that the UP button 434 (634) is operated, the controller unit 45 relocates the item-selection-position in the order of the arrows of FIG. 9C.

Further, when the controller unit 45 determines that the specifying-operation is executed, i.e., the ENTER button 432 (632) is operated, the controller unit 45 executes the process of the item of the item-selection-position. For example, as shown in FIGS. 8A, 8B, 8C, 8D, and 8E, when the controller unit 45 determines that the ENTER button 432 (632) is operated in a status where the item-selection-position is at the position of the icon showing video image setting, the controller unit 45 displays the items in association with the video image setting as the items of the second layer.

FIGS. 8A, 8B, 8C, 8D, and 8E show an example in which the number of the items in association with the video image setting is larger than the second predetermined number, and the items are two-dimensionally-displayed on a plurality of screens of the second layer. Note that one screen including two-dimensionally-arranged items will be treated as a page. In the following description, to change a plurality of item-selection-screens will be referred to as page-change. When the controller unit 45 two-dimensionally-displays items on a plurality of pages, the controller unit 45 assigns and displays a page-change function.

For example, as shown in FIGS. 8C and 8D, 3x3 items are two-dimensionally-displayed on each page of the item-selection-screen of the video image setting. Further, the top of the screen displays a tab to which the page-change function is assigned. Note that the tab-display displays the page number of the item-selection-screen. For example, where the item-selection-screen of the video image setting includes two pages, the tab-display of the first page displays "MENU 1/2", and the tab-display of the second page displays "MENU 2/2".

As shown in FIG. 8C, the first page of the item-selection-screen of the video image setting includes, from the upper-left end in the down-direction, an item in association with setting of the video-image-recording-format, an item in association with setting of the image-taking scene, and an item in association with white balance. Further, the first page of the item-selection-screen of the video image setting includes, from the center-top in the down-direction, an item in association with the image size, bit rate, and the like of the video-image-recording-format, an item in association with color setting, and an item in association with sound recording. Further, the first page of the item-selection-screen of the video image setting includes, from the upper-right end in the down-direction, an item in association with continuous shooting, an item in association with self-timer, and an item in association with exposure correction.

As shown in FIG. 8D, the second page of the item-selection-screen of the video image setting includes, from the upper-left end in the down-direction, items in association with angle-of-view. Further, the second page of the item-selection-screen of the video image setting includes, from the center-top in the down-direction, an item in association with position information recording, and an item in association with device setting. Further, the second page of the item-selection-screen of the video image setting includes, from the upper-right end in the down-direction, an item in association with image upside-down, an item in association with relocation of the item-selection-screen to the upper layer, and the like. Note that each item displays an icon showing currently-set status or the like.

When the item-selection-screen of the second layer is displayed, the controller unit 45 relocates the item-selection-position in the order of the arrows of FIG. 2F or FIG. 9B depending on the operation of the DOWN button 433 (633). Further, the controller unit 45 relocates the item-selection-position in order in the opposite direction depending on the operation of the UP button 434 (634).

FIGS. 10A and 10B are diagrams for illustrating a page-change behavior of the item-selection-screen of the video image setting. For example, as shown in FIG. 10A, when the controller unit 45 determines that the ENTER button 432 (632) is operated in a status where the item-selection-position is at the tab-display position, the controller unit 45 executes page-change, and changes the item-selection-screen to the second page of FIG. 10B. Further, for example, as shown in FIG. 10B, where the controller unit 45 determines that the ENTER button 432 (632) is operated in a status where the item-selection-position is at the tab-display position, the controller unit 45 executes page-change, and changes the item-selection-screen to the first page of FIG. 10A.

Further, FIGS. 11A and 11B are diagrams for illustrating another page-change behavior of the item-selection-screen of the video image setting. The controller unit 45 changes, where no item is adjacent to the items arranged in the selection-direction at the predetermined side of the selection-direction and the item at the end in the selection-direction is selected, the item-selection-screens depending on an item-change-operation thereafter. For example, as shown in FIG. 11A, where no item is adjacent to the items arranged in the selection-direction at the predetermined side of the selection-direction and the item at the end in the selection-direction is selected, i.e., where the item-selection-position is at the lower-right-end position, when the controller unit 45 determines that the DOWN button 433 (633) is operated, the controller unit 45 executes page-change. The controller unit 45 locates an item-selection-position after changing the item-selection-screen at a position of the caption-display. For example, the controller unit 45 changes the item-selection-screen to the second page of FIG. 11B, and thereby locates the item-selection-position at the position of the tab-display. Further, as shown in FIG. 11B, where the controller unit 45 determines that the UP button 434 (634) is operated in a status where the item-selection-position is at the tab-display position, the controller unit 45 executes page-change. Further, the controller unit 45 locates, when the item-change-operation is executed in a status where the item-selection-position is at a position of the caption-display, the item-selection-position at a preset item position on the item-selection-screen after the change. For example, the controller unit 45 changes the item-selection-screen to the first page of FIG. 11A, for example, and locates the item-selection-position at the lower-right-end position.

Further, as shown in FIG. 11B, when the controller unit 45 determines that the UP button 434 (634) is operated in a status where the item-selection-position is at the tab-display position, the controller unit 45 executes page-change. The controller unit 45 changes the item-selection-screen to the first page of FIG. 11A, for example, and locates the item-selection-position at the lower-right-end position.

With reference to FIG. 8C again, when the controller unit 45 determines that the ENTER button 432 (632) is operated in a status where the item-selection-position is at the position of the icon showing an item in association with video-image-recording-format setting, the controller unit 45 displays the item-selection-screen in association with the video-image-recording-format setting as the item-selection-screen of the third layer.

Further, as shown in FIG. 8D, when the controller unit 45 determines that the ENTER button 432 (632) is operated in a status where the item-selection-position is at the position of the icon showing a function to return to the upper layer, the controller unit 45 changes the item-selection-screen of the second layer to the item-selection-screen of the first layer.

FIG. 8E shows an example of the item-selection-screen in association with the video-image-recording-format setting. For example, the item-selection-screen in association with the video-image-recording-format setting executes list-display in order to display a large amount of information of each item.

The item-selection-screen in association with the video-image-recording-format setting displays, from the top in the down-direction, an item for relocating the item-selection-screen to the upper layer, an item for setting MPEG-4 format as the video-image-recording-format, an item for setting the still image mode as the image-taking mode, an item for setting the progressive system of the image size of 4K and the frame rate of 30 Hz, and the like.

The items other than the item for relocating the item-selection-screen to the upper layer includes radio-button-displays. When an item specifying-operation is executed, the controller unit 45 changes the radio-button-display of the specified item to display an object different from the radio-buttons of the other items. For example, when MPEG-4 format is specified as the video-image-recording-format, as shown in FIG. 8E, the controller unit 45 displays a black-circle on the radio-button of the item for setting MPEG-4 format. Further, the controller unit 45 limits in advance the number of items to be displayed on one screen in the list-display to a predetermined display-number. If the number of selectable items exceeds the predetermined display-number, for example, the controller unit 45 displays a scroll bar in order that a user can understand the position of the items, which are displayed on the screen, on the list.

Figure 12:
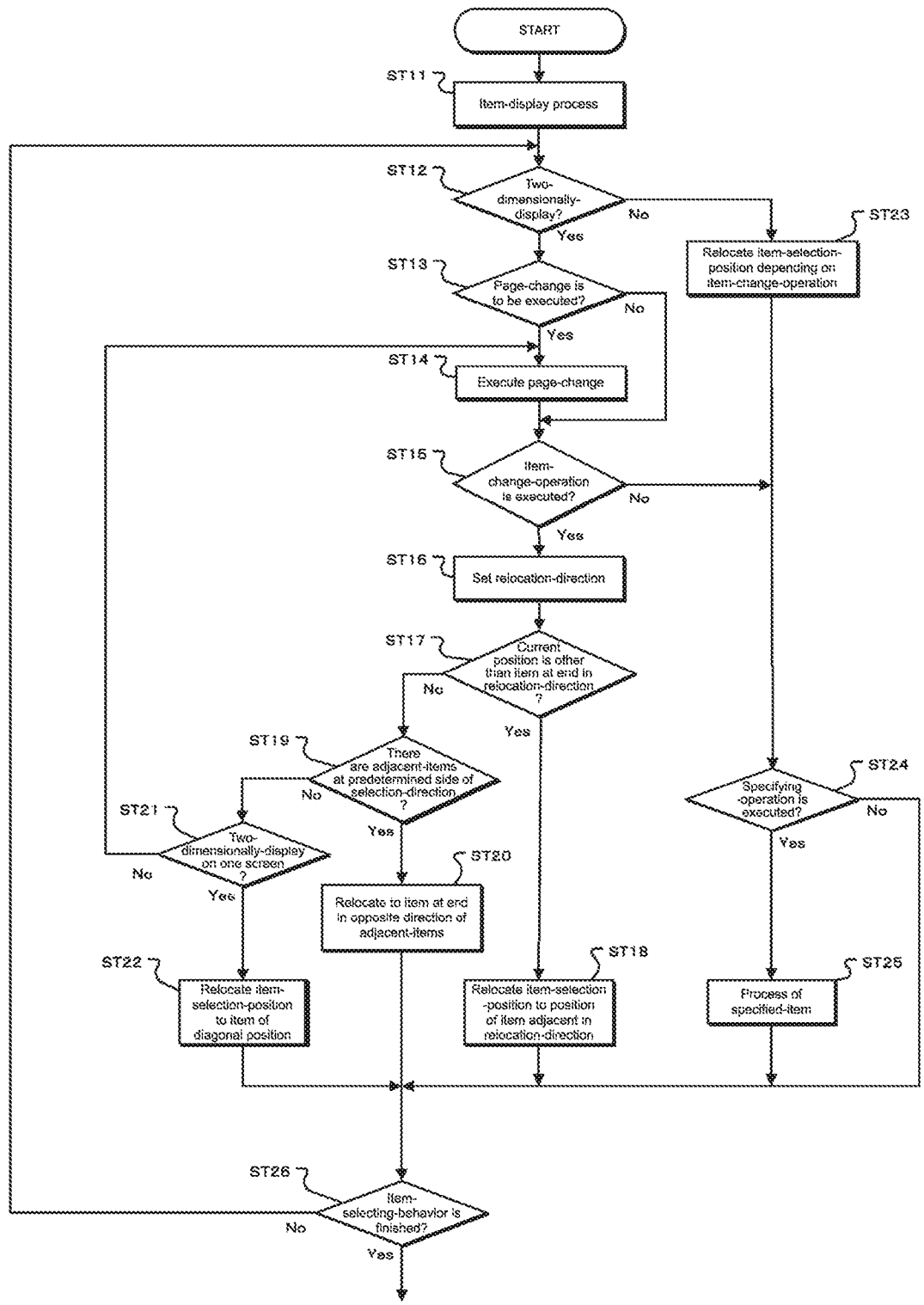
FIG. 12 An example of a flowchart of the item-selecting-behavior of the image-taking apparatus.

FIG. 12 shows an example of a flowchart of the item-selecting-behavior of the image-taking apparatus. In Step ST11, the controller unit 45 executes the item-display process. The controller unit 45 displays the item-selection-screen, which is a table of the selectable items. Where the number of the selectable items is larger than a first predetermined number, the controller unit 45 two-dimensionally-arranges and displays the items. Further, where the number of the selectable items is equal to or smaller than a first predetermined number, the controller unit 45 executes list-display of the items. Further, where the number of the items is larger than the second predetermined number, the controller unit 45 executes the two-dimensionally-display on a plurality of screens. Where the number of the items is equal to or smaller than the second predetermined number, the controller unit 45 executes the two-dimensionally-display on one screen. Further, the controller unit 45 executes the list-display to display a large amount of information of each item.

Figure 13:
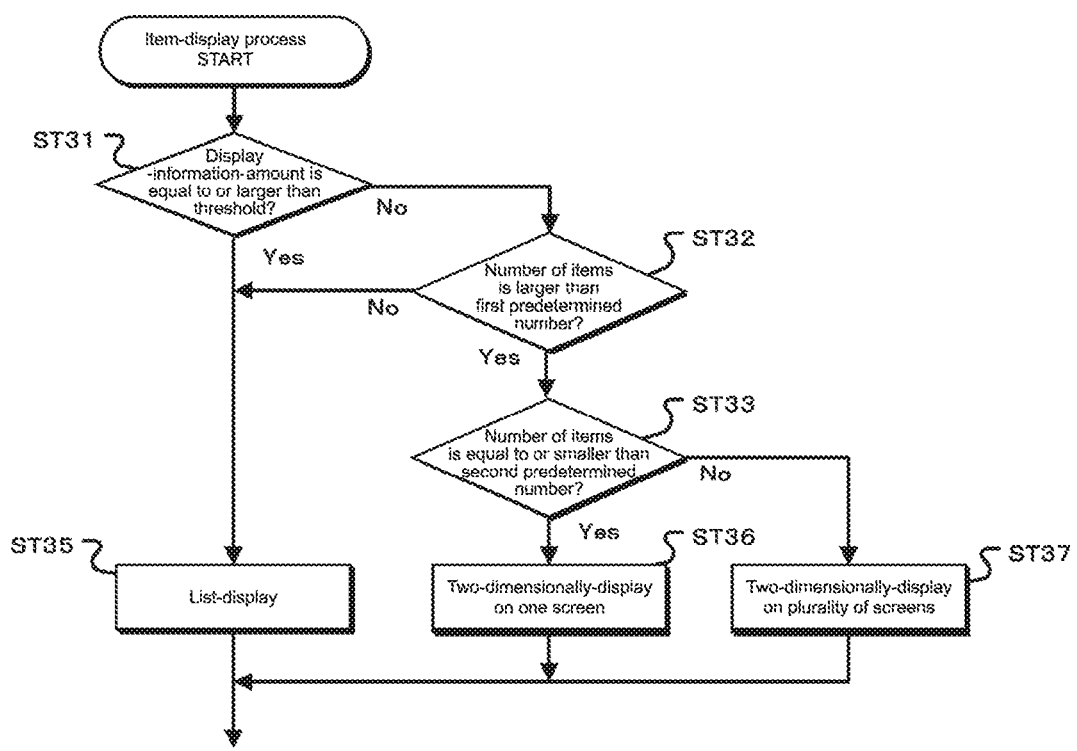
FIG. 13 An example of a flowchart of the item-display process.

FIG. 13 shows an example of a flowchart of the item-display process. In Step ST31, the controller unit 45 determines whether or not the display-information-amount is equal to or larger than a threshold. Where the display-information-amount of each item is smaller than the threshold, the controller unit 45 proceeds to Step ST32. Where the display-information-amount of each item is equal to or larger than the threshold, the controller unit 45 proceeds to Step ST35. Note that the display-area size necessary to display information may be used as the display-information-amount.

In Step ST32, the controller unit 45 determines whether or not the number of the items is larger than the first predetermined number. Where the number of the items is larger than the first predetermined number, the controller unit 45 proceeds to Step ST33. Where the number of the items is equal to or smaller than the first predetermined number, the controller unit 45 proceeds to Step ST35.

In Step ST33, the controller unit 45 determines whether or not the number of the items is equal to or smaller than the second predetermined number. Where the number of the items is equal to or smaller than the second predetermined number, the controller unit 45 proceeds to Step ST36. Where the number of the items is larger than the second predetermined number, the controller unit 45 proceeds to Step ST37.

In Step ST35, the controller unit 45 executes list-display. The controller unit 45 displays the item-selection-screen of the list-display, in which the items are arranged in the predetermined selection-direction, and in which the display-area is prepared to be capable of displaying information of each item.

In Step ST36, the controller unit 45 two-dimensionally-displays the items on one screen. The controller unit 45 displays the item-selection-screen, in which the items are two-dimensionally-arranged on one screen.

In Step ST37, the controller unit 45 two-dimensionally-displays the items on a plurality of screens. The controller unit 45 displays the item-selection-screens, in which the number of the items two-dimensionally-arranged on one screen is limited, and in which all the items are displayed on a plurality of screens.

With reference to FIG. 12 again, in Step ST12, the controller unit 45 determines whether or not the displayed screen is the two-dimensionally-display. Where the controller unit 45 determines that the displayed screen is the two-dimensionally-display, the controller unit 45 proceeds to Step ST13. Where the controller unit 45 determines that the displayed screen is the list-display, the controller unit 45 proceeds to Step ST23.

In Step ST13, the controller unit 45 determines whether or not page-change is to be executed. When the ENTER button is operated in a status where the item-selection-position is at the position of the item to which the page-change function is assigned, the controller unit 45 determines that the page-change-operation is executed. Where the controller unit 45 determines that the page-change-operation is executed, the controller unit 45 proceeds to Step ST14. Where the controller unit 45 does not determine that the page-change-operation is executed, the controller unit 45 proceeds to Step ST15.

In Step ST14, the controller unit 45 executes page-change. The controller unit 45 displays a new item-selection-screen and proceeds to Step ST15. Further, the controller unit 45 sets a page-change direction depending on a user's operation for the page-change. For example, in order to execute the page-change after the specifying-operation is executed in Step ST13, the controller unit 45 executes the page-change in the direction from the first page to the last page (hereinafter referred to as "forward direction"). Further, the controller unit 45 executes the page-change in the forward direction on the basis of the operation of the DOWN button, and executes the page-change in the direction opposite to the forward direction on the basis of the operation of the UP button (described later).

In Step ST15, the controller unit 45 determines whether or not the item-change-operation is executed. The controller unit 45 determines whether the DOWN button or the UP button is operated. Where the controller unit 45 determines that one of the buttons is operated, the controller unit 45 proceeds to Step ST16. Where the controller unit 45 determines that no button is operated, the controller unit 45 proceeds to Step ST24.

In Step ST16, the controller unit 45 sets the relocation-direction. The controller unit 45 executes setting of the relocation-direction of the item-selection-position (selection-direction of item) depending on the operated button. For example, where the DOWN button is operated, the controller unit 45 sets the downward-direction as the relocation-direction. Where the UP button is operated, the controller unit 45 sets the upward-direction as the relocation-direction. Then the controller unit 45 proceeds to Step ST17.

In Step ST17, the controller unit 45 determines whether or not the current position is at the item at the end in the relocation-direction. Where the current position is not at the item at the end in the relocation-direction, the controller unit 45 proceeds to Step ST18. Where the current position is at the item at the end in the relocation-direction, the controller unit 45 proceeds to Step ST19.

In Step ST18, the controller unit 45 relocates the item-selection-position to the position of the item adjacent in the relocation-direction, and proceeds to Step ST26.

In Step ST19, the controller unit 45 determines whether or not there are adjacent-items at a predetermined side of the selection-direction. Where there are adjacent-items adjacent to the items, which are arranged in the selection-direction, at a predetermined side of the selection-direction, the controller unit 45 proceeds to Step ST20. Where there is no adjacent-item, the controller unit 45 proceeds to Step ST21.

In Step ST20, the controller unit 45 relocates the item-selection-position to the item at the end in the opposite direction of the adjacent-items. The controller unit 45 has relocated the item-selection-position to the position of the item at the end in the relocation-direction. So the controller unit 45 relocates the item-selection-position to the item at the end in the opposite direction of the adjacent-items at the predetermined side in the selection-direction in order to be capable of selecting the adjacent-items in order in the selection-direction. Then the controller unit 45 proceeds to Step ST26.

In Step ST21 after Step ST19, the controller unit 45 determines whether or not the items are two-dimensionally-displayed on one screen. Where the controller unit 45 determines that the items are two-dimensionally-displayed on one screen in the item-display process of Step ST11, the controller unit 45 proceeds to Step ST22. Further, where the controller unit 45 determines that the items are two-dimensionally-displayed on a plurality of screens, the controller unit 45 returns to Step ST14. The controller unit 45 executes the page-change, and two-dimensionally-displays new items.

In Step ST22, the controller unit 45 relocates the item-selection-position to the item of the diagonal-corner position on the item-selection-screen, and proceeds to Step ST26.

In Step ST23 after Step ST12, the controller unit 45 relocates the item-selection-position depending on the item-change-operation. For example, where the DOWN button is operated, the controller unit 45 relocates the item-selection-position to the position of the item adjacent in the down-direction. Where the UP button is operated, the controller unit 45 relocates the item-selection-position to the position of the item adjacent in the up-direction. The controller unit 45 relocates the item-selection-position depending on the item-change-operation, and proceeds to Step ST24.

In Step ST24 after Step ST23 or Step ST15, the controller unit 45 determines whether or not the specifying-operation is executed. For example, where the ENTER button is operated, the controller unit 45 determines that the specifying-operation is executed, and proceeds to Step ST25. Where the ENTER button is not operated, the controller unit 45 determines that the specifying-operation is not executed, and proceeds to Step ST26.

In Step ST25, the controller unit 45 executes the process of the specified-item. The controller unit 45 executes setting such that the image-taking apparatus 30 executes the function and the behavior assigned to the specified-item, the specified-item being the item at the item-selection-position. Further, where the selectable items are in the layered structure, and where there are a plurality of items in the lower layer of the item at the item-selection-position, the controller unit 45 executes the process similar to the process of the flowchart of FIG. 12 for the plurality of items of the lower layer, and selects an item depending on a user's operation. Note that, where the items are in the layered structure, the controller unit 45 provides an item for returning from the lower layer to the upper layer in order to be capable of selecting a new item in the upper layer. The controller unit 45 executes the specified-item, and proceeds to Step ST26.

In Step ST26, the controller unit 45 determines whether or not the item-selecting-behavior is finished. For example, where the MENU button is operated, the controller unit 45 determines that the item-selecting-behavior is finished, and changes display from the item-selection-screen to the home screen. Further, where the MENU button is not operated, the controller unit 45 determines that the item-selecting-behavior is not finished, and returns to Step ST12.

By executing the aforementioned process, the controller unit 45 can execute the item-selecting-behavior of FIGS. 8A, 8B, 8C, 8D, 8E, 9A, 9B, 10A and 10B. Note that the flowchart of FIG. 12 is an example, and the item-selecting-behavior of FIGS. 8A, 8B, 8C, 8D, 8E, 9A, 9B, 10A, and 10B is not limited to the process of the process of FIG. 12.

Further, not the controller unit 45 but the controller unit 65 of the remote control apparatus 50 may execute the aforementioned item-selecting-behavior. The controller unit 65 may inform the image-taking apparatus 30 of the function selected by a user and the status set by the user, and the image-taking apparatus 30 may execute the behavior depending on the user's operation. Note that the items of the application example are merely examples. The items may not necessarily be included, and new items may be included.

According to the image-taking system having the aforementioned configuration, without providing directional operation buttons for relocating the item-selection-position right, left, up, and down, for example, it is possible to select a desired item by providing an operation button to relocate the item-selection-position in a predetermined selection-direction and only by operating the operation button by a user. As a result, the image-taking apparatus and the remote control apparatus may be downsized. Further, since the selectable items are two-dimensionally-arranged on the item-selection-screen displayed on the display units of the image-taking apparatus and the remote control apparatus, a user may easily understand the selectable items. As a result, it is possible to execute setting of a desired item efficiently and easily.

3. Other Embodiments

In the aforementioned application example, the information processing apparatus is applied to the image-taking system including the image-taking apparatus and the remote control apparatus, for example. However, the information processing apparatus is applicable to other electronic apparatuses. For example, some controller apparatuses, measure apparatuses, and the like are necessary to be downsized, have many selectable items, and are used under an environment that requires gloves and the like. It is difficult to operate a touch panel of such an apparatus under such an environment with gloves. By applying the information processing apparatus to such an apparatus, it is possible to execute setting of a desired item efficiently and easily.

Further, in the aforementioned embodiment, when the item-change-button is operated, the item-selection-position is relocated in a predetermined selection-direction or the opposite direction, for example. Alternatively, the item-selecting-behavior may be changed to a different behavior depending on the operation-duration time of the item-change-button. For example, if the operation-duration time is equal to or smaller than a preset threshold, the item-selection-position may be relocated in a predetermined selection-direction or the opposite direction. If the operation-duration time is larger than the threshold, page-change may be executed, or the item-selection-position may be relocated in a direction of the adjacent-items at a predetermined side of the selection-direction, with respect to the predetermined selection-direction. Further, if the operation-duration time is larger than the threshold, the item-selection-position may be relocated one by one in a predetermined direction or the opposite direction until the operation is finished. As a result, it is possible to relocate the item-selection-position efficiently to a desired position.

Further, in the aforementioned embodiment, the controller unit selects items in a first direction in order, the items being two-dimensionally-arranged in the first direction and a second direction orthogonal to the first direction, selects an item at an end in the first direction, and then selects adjacent-items in order in the first direction from an item at an end in a direction opposite to the end in the first direction, the adjacent-items being adjacent at a side of the second direction, for example. However, in the two-dimensional-arrangement, the second direction may not be orthogonal to the first direction.

Further, a series of process described in the specification may be executed by hardware, software, or a combination thereof. To execute the process by software, a program that records the process sequence is installed in a memory of a computer embedded in dedicated hardware, and is executed by the computer. Alternatively, a program may be installed in a general-purpose computer, which can execute various kinds of process, and may be executed by the computer.

For example, the program may be recorded in advance in a recording medium such as a hard disk, an SSD (Solid State Drive), and a ROM (Read Only Memory). Alternatively, the program may be temporarily or persistently stored (recorded) in a removable recording medium such as a flexible disk, a CD-ROM (Compact Disc Read Only Memory), a MO (Magneto optical) disc, a DVD (Digital Versatile Disc), a BD (Blu-Ray Disc (registered trademark)), a magnetic disk, and a semiconductor memory card. Such a removable recording medium may be supplied as a so-called package software.

Further, the program may be not only installed in a computer from a removable recording medium, but also transferred wirelessly or wiredly to a computer from a website-for-download via a network such as a LAN (Local Area Network) and the Internet. The computer may receive the transferred program as described above, and the program may be installed in a built-in recording medium such as a hard disk.

Note that effects described in the present description are not limitations but merely examples. Undescribed additional effects may be obtained. Further, the present technology should not be interpreted by limiting to the aforementioned embodiments. The embodiments of the present technology disclose the present technology for examples. It is obvious that people skilled in the art may modify and substitute the embodiments without departing from the gist of the present technology. In other words, to determine the gist of the present technology, the scope of claims should be referred to.

Further, an information processing apparatus of the present technology may employ each of the following configurations.

(1) An information processing apparatus, including:
   a controller unit that
     selects, every time an operation input unit receives an item-change-operation, items two-dimensionally-arranged on an item-selection-screen in order in a predetermined selection-direction,
     selects an item at an end in the selection-direction, and then
     selects adjacent-items in order in the selection-direction from an item at an end in a direction opposite to the selection-direction, the adjacent-items being adjacent at a predetermined side of the selection-direction.

(2) The information processing apparatus according to (1), in which
   the controller unit
     selects, where no item is adjacent to the items arranged in the selection-direction at the predetermined side of the selection-direction, the item at the end in the selection-direction, and then
     selects an item at a diagonal corner of the item-selection-screen.

(3) The information processing apparatus according to (1) or (2), in which
   the controller unit
     displays, where the number of the items is larger than a predetermined number, the items on a plurality of item-selection-screens separately, and
     changes, where no item is adjacent to the items arranged in the selection-direction at the predetermined side of the selection-direction and the item at the end in the selection-direction is selected, the item-selection-screens depending on an item-change-operation thereafter.

(4) The information processing apparatus according to (3), in which
the controller unit
provides caption-display for selecting and displaying the item-selection-screen for each item-selection-screen, and
locates an item-selection-position after changing the item-selection-screen at a position of the caption-display.
(5) The information processing apparatus according to (4), in which
the controller unit changes, when a specifying-operation is executed in a status where the item-selection-position is at the caption-display, the item-selection-screens.
(6) The information processing apparatus according to (4), in which
the controller unit locates, when the item-change-operation is executed in a status where the item-selection-position is at a position of the caption-display, the item-selection-position at a preset item position on the item-selection-screen.
(7) The information processing apparatus according to any one of (1) to (6), in which
the items are in a layered structure, and
the controller unit
changes layers, when a specifying-operation is executed and where an item at an item-selection-position is not an item of a lowermost layer, and
displays an item-selection-screen in association with the item at the item-selection-position.
(8) The information processing apparatus according to (7), in which
the controller unit adds an item, to which a function to return to the item-selection-screen before changing the layers is assigned, to an item-selection-screen after changing the layers.
(9) The information processing apparatus according to any one of (1) to (8), in which
the controller unit displays, where a display-information-amount of the items is equal to or larger than a threshold, an item-selection-screen including list-display of the items.
(10) The information processing apparatus according to any one of (1) to (9), in which
the operation input unit includes an item-change-operation-section that receives the item-change-operation, and
the item-change-operation-section is arranged at a position displaced from a center of a display unit in the predetermined selection-direction, the display unit displaying the item-selection-screen.
(11) The information processing apparatus according to (10), in which
the operation input unit includes a first item-change-operation-section and a second item-change-operation-section,
the first item-change-operation-section is arranged at a position displaced from the center of the display unit in the predetermined selection-direction,
the second item-change-operation-section is arranged at a position displaced from the center of the display unit in a direction opposite to the predetermined selection-direction,
the controller unit selects, every time a user's operation is executed in the first item-change-operation-section, items in order in the predetermined selection-direction, the items being arranged in the predetermined selection-direction, and
the controller unit selects, every time a user's operation is executed in the second item-change-operation-section, the items in order in a direction opposite to the direction when the operation is executed in the first item-change-operation-section.
(12) The information processing apparatus according to any one of (1) to (11), in which
the controller unit
selects items in a first direction in order, the items being two-dimensionally-arranged on the item-selection-screen in the first direction and a second direction orthogonal to the first direction,
selects an item at an end in the first direction, and then
selects adjacent-items in order in the first direction from an item at an end in a direction opposite to the end in the first direction, the adjacent-items being adjacent at a side of the second direction.

INDUSTRIAL APPLICABILITY

The information processing apparatus, the information processing method, or the program of the present technology selects, every time an operation input unit receives an item-change-operation, items two-dimensionally-arranged on an item-selection-screen in order in a predetermined selection-direction, selects an item at an end in the selection-direction, and then selects adjacent-items in order in the selection-direction from an item at an end in a direction opposite to the selection-direction, the adjacent-items being adjacent at a predetermined side of the selection-direction. As a result, only by executing the item-change-operation again and again, it is possible to easily select a desired item from a plurality of two-dimensionally-displayed items. It is difficult to operate touch panels of some electronic apparatuses and the like. Therefore by applying the present technology to such an electronic apparatus, it is possible to execute setting of a desired item efficiently and easily.

REFERENCE SIGNS LIST

10 information processing apparatus
11 processor unit
12, 42, 62 display unit
13, 43, 63 operation input unit
15, 45, 65 controller unit
20 image-taking system
30 image-taking apparatus
31 image-taking unit
32 image signal processor unit
33 recoding-and-reproducing unit
34 output unit
35, 55 time-counting unit
36, 56 communication unit
46, 66 memory unit
50 remote control apparatus
131, 132 item-change-button
431 to 434 operation button

The invention claimed is:
1. An information processing apparatus, comprising:
circuitry configured to:
determine that a number of a plurality of items is greater than a specific number;
control display of the plurality of items two-dimensionally on a plurality of item-selection-screens based on the determination that the number of the plurality of items is greater than the specific number, wherein a first item-selection-screen of the plurality of item-selection-screens displays a first set of items of the plurality of items, and
a second item-selection-screen of the plurality of item-selection-screens displays a second set of items of the plurality of items;
control each item-selection-screen of the plurality of item-selection-screens to display a caption-display, wherein
the caption-display is for selection and display of each item-selection-screen of the plurality of item-selection-screens,
the caption-display indicates a page number of the respective item-selection screen of the plurality of item-selection-screens, and
the caption-display is different from the displayed plurality of items;
receive an item-change-operation on the first set of items of the first item-selection-screen;
select, an item from the first set of items each time the item-change-operation is received, wherein the selection of the item from the first set of items is in a first selection-direction;
select an item of the first set of items at an end in the first selection-direction of the first item-selection-screen based on the received item-change-operation;
select adjacent-items of the first set of items in an order in the first selection-direction from an item at an end in a second selection-direction opposite to the first selection-direction, wherein the adjacent-items are adjacent at a specific side of the first selection-direction;
determine that no item is adjacent to the adjacent-items at the specific side of the first selection-direction;
change the first item-selection-screen to the second item-selection-screen based on the determination that no item is adjacent to the adjacent-items at the specific side of the first selection-direction; and
locate an item-selection-position to a position of the caption-display of the second item-selection-screen based on the change of the first item-selection-screen to the second item-selection-screen.

2. The information processing apparatus according to claim 1, wherein the circuitry is further configured to:
determine execution of a specifying-operation in a status where the item-selection-position is at the caption-display of the first item-selection-screen; and
change the first item-selection-screen to the second item-selection-screen based on the determined execution of the specifying-operation.

3. The information processing apparatus according to claim 1, wherein the circuitry is further configured to:
determine execution of the item-change-operation in a status where the item-selection-position is at the position of the caption-display; and
locate, based on the determined execution of the item-change-operation in the status where the item-selection-position is at the position of the caption-display, the item-selection-position at a preset item position on the second item-selection-screen.

4. The information processing apparatus according to claim 1, wherein
the plurality of items is displayed in a layered structure, and
the circuitry is further configured to:
change a plurality of layers based on each of execution of a specifying-operation and a determination that an item of the plurality of items at the item-selection-position is not an item of a lowermost layer; and
control display of an item-selection-screen in association with the item at the item-selection-position.

5. The information processing apparatus according to claim 4, wherein the circuitry is further configured to add an item, to which a function to return to the first item-selection-screen before change of the plurality of layers is assigned, to the second item-selection-screen based on the change of the plurality of layers.

6. The information processing apparatus according to claim 1, wherein the circuitry is further configured to control the first item-selection-screen to a list-display the first set of items based on a display-information-amount of the first set of items being one of equal to or larger than a threshold.

7. The information processing apparatus according to claim 1, further comprising an item-change-operation-section configured to receive the item-change-operation, wherein
the item-change-operation-section is arranged at a position displaced from a center of a display screen in the first selection-direction, and
the display screen corresponds to one of the first item-selection-screen or the second item-selection-screen.

8. The information processing apparatus according to claim 7, wherein
the item-change-operation-section includes a first item-change-operation-section and a second item-change-operation-section,
the first item-change-operation-section is arranged at a position displaced from the center of the display screen in the first selection-direction,
the second item-change-operation-section is arranged at a position displaced from the center of the display screen in the second selection-direction opposite to the first selection-direction,
the circuitry is further configured to select, each time a user's operation is executed in the first item-change-operation-section, the first set of items in the order in the first selection-direction,
the first set of items is arranged in the first selection-direction, and
the circuitry is further configured to select, each time a user's operation is executed in the second item-change-operation-section, the first set of items in an order in the second selection-direction opposite to the first selection-direction.

9. The information processing apparatus according to claim 1, wherein
the first set of items is two-dimensionally-arranged on the first item-selection-screen in a first direction and a second direction orthogonal to the first direction, and
the adjacent-items are adjacent at a side of the second direction.

10. An information processing method, comprising:
in an information processing apparatus:
determining that a number of a plurality of items is greater than a specific number;
controlling display of the plurality of items two-dimensionally on a plurality of item-selection-screens based on the determination that the number of the plurality of items is greater than the specific number, wherein
a first item-selection-screen of the plurality of item-selection-screens displays a first set of items of the plurality of items, and a second item-selection-screen of the plurality of item-selection-screens displays a second set of items of the plurality of items;
controlling each item-selection-screen of the plurality of item-selection-screens to display a caption-display, wherein
   the caption-display is for selection and display of each item-selection-screen of the plurality of item-selection-screens,
   the caption-display indicates a page number of the respective item-selection-screen of the plurality of item-selection-screens, and
   the caption-display is different from the displayed plurality of items;
receiving an item-change-operation on the first set of items of the first item-selection-screen;
selecting an item from the first set of items each time the item-change-operation is received, wherein the selection of the item from the first set of items is in a first selection-direction;
selecting an item of the first set of items at an end in the first selection-direction of the first item-selection-screen based on the received item-change-operation;
selecting adjacent-items of the first set of items in an order in the first selection-direction from an item at an end in a second selection-direction opposite to the first selection-direction, wherein the adjacent-items are adjacent at a specific side of the first selection-direction;
determining that no item is adjacent to the adjacent-items at the specific side of the first selection-direction;
changing the first item-selection-screen to the second item-selection-screen based on the determination that no item is adjacent to the adjacent-items at the specific side of the first selection-direction; and
locating an item-selection-position to a position of the caption-display of the second item-selection-screen based on the change of the first item-selection-screen to the second item-selection-screen.

11. A non-transitory computer-readable medium having stored thereon computer-executable instructions which, when executed by a processor, cause the processor to execute operations, the operations comprising:
determining that a number of a plurality of items is greater than a specific number;
controlling display of the plurality of items two-dimensionally on a plurality of item-selection-screens based on the determination that the number of the plurality of items is greater than the specific number, wherein
   a first item-selection-screen of the plurality of item-selection-screens displays a first set of items of the plurality of items, and
   a second item-selection-screen of the plurality of item-selection-screens displays a second set of items of the plurality of items;
controlling each item-selection-screen of the plurality of item-selection-screens to display a caption-display, wherein
   the caption-display is for selection and display of each item-selection-screen of the plurality of item-selection-screens,
   the caption-display indicates a page number of the respective item-selection screen of the plurality of item-selection-screens, and
   the caption-display is different from the displayed plurality of items;
receiving an item-change-operation on the first set of items of the first item-selection-screen;
selecting an item from the first set of items each time the item-change-operation is received, wherein the selection of the item from the first set of items is in a first selection-direction;
selecting an item of the first set of items at an end in the first selection-direction of the first item-selection-screen based on the received item-change-operation;
selecting adjacent-items of the first set of items in an order in the first selection-direction from an item at an end in a second selection-direction opposite to the first selection-direction, wherein the adjacent-items are adjacent at a specific side of the first selection-direction;
determining that no item is adjacent to the adjacent-items at the specific side of the first selection-direction;
changing the first item-selection-screen to the second item-selection-screen based on the determination that no item is adjacent to the adjacent-items arranged at the specific side of the first selection-direction; and
locating an item-selection-position to a position of the caption-display of the second item-selection-screen based on the change of the first item-selection-screen to the second item-selection-screen.

\* \* \* \* \*